April 13, 1965   H. E. BATES   3,177,996
ELECTROMAGNETICALLY OPERATED FRICTION COIL CLUTCH
Filed Oct. 1, 1962
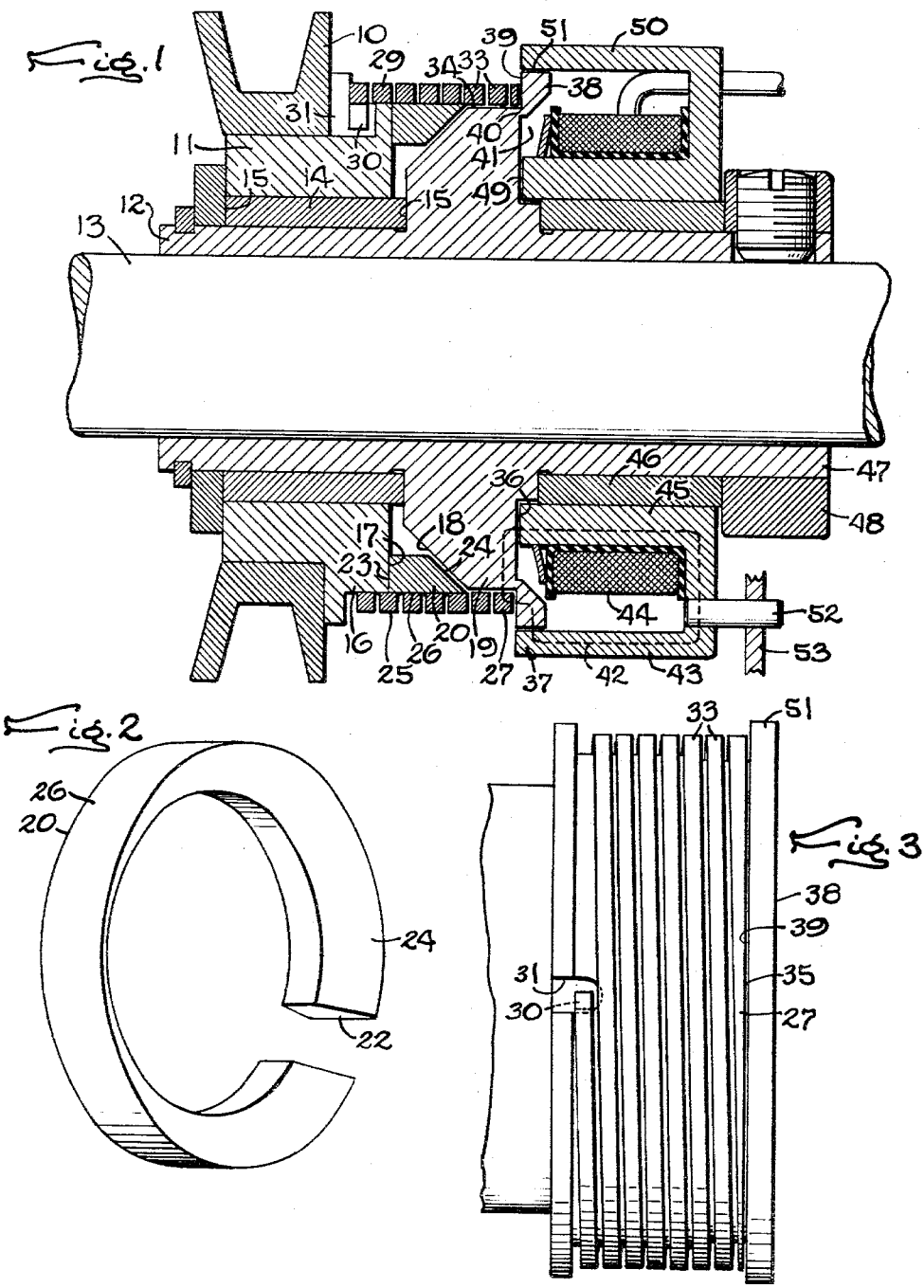
INVENTOR
Harold E. Bates
By Wolfe, Hubbard, Voit & Osann
ATTORNEYS

United States Patent Office 3,177,996
Patented Apr. 13, 1965

3,177,996
ELECTROMAGNETICALLY OPERATED FRICTION COIL CLUTCH
Harold E. Bates, Beloit, Wis., assignor to Warner Electric Brake & Clutch Company, South Beloit, Ill., a corporation of Delaware
Filed Oct. 1, 1962, Ser. No. 227,196
6 Claims. (Cl. 192—35)

This invention relates to friction clutches and brakes of the so-called coil type in which a main friction clutch is pressed radially into gripping engagement with relatively rotatable surfaces by a helical coil of resilient wire which is wound and unwound under the control of a pilot clutch which is preferably controlled magnetically.

The primary object is to provide a coupling of the above character in which the torque of the magnetic pilot clutch and one of the rotatable friction surfaces are parts of the actuator coil utilized in a novel manner to form an auxiliary friction clutch for augmenting the activating torque of the magnetic pilot clutch.

A further object is to greatly simplify the construction of the magnetic pilot clutch.

A more detailed object is to untilize a part of the auxiliary pilot clutch to form a part of the flux circuit of the magnetic pilot clutch so as to permit the formation of the two magnetic poles as a single integral piece.

Other objects and advantages of the invention will become apparent from the following detailed description taken in connection with the accompanying drawings, in which FIGURE 1 is an enlarged diametrical cross-sectional view of the improved friction coupling and its mounting with part shown in diametrical section.

FIG. 2 is a perspective view of the friction band or shoe.

FIG. 3 is a fragmentary plan view of part of FIG. 1.

While the invention is applicable to friction couplings of both the expanding and contracting types, a clutch of the contracting band type is shown in the present instance arranged to transmit rotary power from a V-belt pulley 10 on a driving member or sleeve 11 to a driven member or sleeve 12 fixed on a shaft 13. Herein, the driving sleeve is journaled on a bearing 14 encircling and fixed between abutments 15 to one end portion of the driven sleeve 12. An outturned flange 16 on the inner end of the sleeve defines an axially facing annular surface 17 which constitutes the driving friction surface of the main friction clutch.

The driven surface 18 of the main clutch is formed around the periphery of one side portion of a flange 19 integral with the driven sleeve intermediate the ends thereof. Preferably the surface is frusto-conical and is spaced axially from and converges inwardly toward the driving surface 17 to form a groove of generally V-shaped cross-section.

Frictional coupling of the driving and driven surfaces is effected by a ring-like split friction band or arcuate shoe 20 disposed in the V-groove and contractible and expansible radially into and out of gripping engagement with main clutch surfaces 17 and 18. While the band may comprise a plurality of segments, it is preferably a single piece ring split at one point 22. It is composed of any well known brake lining material such, for example, as a composition known as 610–147 sold by American Brake Block Company. Such material possesses enough resiliency to expand the band when the contracting pressure is relieved.

Surfaces 23 and 24 around opposite sides of the band face axially and conform to the contour of the driving and driven surfaces 17 and 18 which in the present instance converge inwardly and provide a wedging action for increasing the gripping force when the band is pressed inwardly and thus contracted to engage the main clutch. Such contraction is effected in the contracting type of clutch by winding up a cylindrical coil 25 of spring wire wrapped helically around the outer cylindrical surface 26 of the band in a direction to wind up and contract the coil when the end turn 27, which is left free, is turned relative to the driving member 11 in a direction opposite to rotation thereof, the other end turn 29 of the coil being fixed on the driving member 11. While the wire of the coil may be formed of any desired cross-section, it is preferably rectangular with the longer dimension disposed normal to the coil axis.

In the relaxed condition, the coil telescopes loosely around the band surface 26 as shown in FIG. 1 and is made somewhat longer than the axial width of the band so that opposite end portions overhang the sides of the band. Beyond the driving surface 17, the turn 29 telescopes closely with the outer surface of the flange 16 and a hook 30 bent from the extreme end portion of the wire projects into a recess 31 in the flange 16 of the driving sleeve 11 thus anchoring the coil end to the latter.

In accordance with the present invention, one or more turns 33 and 27, three in this instance, at the opposite end of the coil encircle a cylindrical outer surface 34 formed around the outer periphery of the flange 19 of the driven sleeve and, for a purpose to appear later, having a diameter slightly less than the diameter of the outer surface 26 of the band when the latter is expanded. The end turn 27 of the coil is ground off to provide a flat axially facing end surface 35 which, in the relaxed condition of the coil is disposed substantially in the transaxial plane of a surface 36 machined on the outer side of the flange 19. The turn 27 consitiutes the armature of the magnetic pilot clutch 37 by which a friction drag may be exerted on the end surface 35 to utilize the relative turning of the driving and driven members in winding up the coil to contract the band and engage the main clutch.

With the armature turn telescoped closely around the cylindrical surface in all conditions of the coil, this surface 34 may be utilized as one of the magnet poles from which flux threads radially into the inner edge of the armature. The other pole of the magnet comprises a ring 38 rigid with the driven member 12 and having a face 39 disposed in a transaxial plane immediately adjacent and opposite the armature face 35 and substantially in the plane of the surface 36. The surfaces 34 and 39 of opposite polarity are separated by a narrow gap 40 of high reluctance formed in accordance with the present invention as a thin and narrow ring integral on one side with the inner pole face 34 and on the other side with the inner edge of the axial face 39. This is accomplished by machining the outer end portion driven member 12 in its original form to provide a groove 41 with its outer wall defining the inner periphery of the ring 38. Herein, the axial thickness of the metal forming the gap 40 is about .004 of an inch and the radial width is about .022 of an inch.

The toroidally shaped flux circuit of the pilot clutch is indicated at 42 and is completed by a stationary magnetic core in the form of a ring 43 of U-shaped cross-section enclosing a multiple turn winding 44 fixed in the core. The inner leg 45 of the core is journaled on a bearing 46 fixed on a hub 47 of the driven sleeve 12 and axially positioned by a collar 48 set screwed to the shaft 13. The collar also positions the inner end 49 of the core leg close to the surface 36 on the driven flange. The outer leg 50 of the core projects axially across and telescopes closely with the outer cylindrical surface 51 of the pole ring 38. A projection 52 on the core engages a stationary part 53 of the eventual clutch mounting thus holding the core against turning.

The flux circuit 42 thus formed extends around the stationary core, radially inwardly across the radial gap and into the ring 38, axially across the narrow gap between the pole face 39 and the armature turn 27, then radially through this turn and across the radial gap around the surface 34, into the flange 19 and finally axially across the gap at the inner end of the core leg 45. It will be apparent that when the winding is energized, the flux threading the circuit 42 will cause the armature turn 27, which is normally spaced slightly away from the pole face 39, to be drawn into gripping engagement with the then stationary pole face 39 of the driven member, thus imposing a friction drag on the free end of the coil 25 then turning with the driving member. As a result, the coil is wound up and therefore contracted around the band thus pressing the latter against the main clutch surfaces 17 and 18 to couple the driving and driven members together.

By extending the free end portion of the coil beyond the side of the band and telescoping the same with the surface 34 rigid with the driven member, it is possible to form a simple auxiliary friction clutch engaged and disengaged by the action of the magnetic pilot clutch and operating to greatly augment the torque applied to the actuator coil for winding up the latter and energizing the main clutch. For this purpose, the cylindrical surface 34 is made slightly smaller in diameter, by about .007 to .011 of an inch than the internal surface of the coil 25 when the latter is free.

With this arrangement, the inner surfaces of the turns 27 and 33 will contract with the coil as the latter is wound up by the drag applied by the pilot clutch when the latter is energized and resulting from attraction of the free end turn 27 axially and radially into gripping engagement with the surfaces 39 and 34 by the flux threading the circuit 42. These turns will be contracted along with the other coil turns and the band and thus become pressed into gripping engagement with the surface 34. The additional friction drag thus exerted on the free end portion of the coil causes further winding up of the coil thus augmenting substantially the pressure exerted on the band and therefore the torque output of the main clutch. When the pilot clutch is deenergized, the auxiliary clutch is inactivated as the coil and band expand to normal positions.

With the arrangement above described, a substantial part of the pilot torque required for contracting the band to produce the desired output of the main clutch is supplied by the auxiliary pilot clutch which is formed by surfaces on parts already present in the main clutch structure. Accordingly, the structure of the magnetic pilot clutch may be simplified and lesser efficiency thereof may be tolerated. Thus, the integral section 40 may be used to impart the necessary high reluctance separating the inner and outer poles 34 and 39 of opposite polarity and also support the rotatable outer pole ring 38.

In addition to simplifying the over-all construction of the pilot clutch, the integral connection 40 between the inner and outer pole faces 34 and 39 performs the important function of providing a flux by-pass through which the low density residual flux may pass after deenergization of the winding 44, thus insuring proper release of the main clutch. The winding 44 is of course designed to over-saturate the connection 40 when energized to engage the main clutch as above described.

I claim as my invention:

1. A magnetic friction clutch having, in combination, a main friction clutch comprising first and second members disposed end to end and mounted for relative rotation about a common axis and having peripheral friction surfaces around their adjacent ends, and a free floating radially expansible split band encircling and overlapping said surfaces and contractible in gripping engagement therewith, said band having an outer periphery concentric with said axis, an actuator for said main clutch comprising a helical coil of resilient magnetic metal telescoped around said band, means anchoring one end of said coil to said first member beyond one side of the band, the turn at the other end of said coil being free and spaced axially and outwardly beyond the opposite side of the band and constituting a magnetic armature, a magnetic pilot clutch for winding and unwinding said coil comprising said armature, an axially facing pole face rotatable with said second member and disposed adjacent and opposite the axially facing and outer side of said free end turn for axial gripping engagement with such turn, and means for creating magnetic flux in a toroidal path through said pole face and armature to draw the two into axial gripping engagement whereby to wind up the coil and contract said band against said friction surfaces, and means for augmenting the wind-up torque of said pilot clutch comprising a generally cylindrical surface formed on said second member and telescoped within said free end turn between said band and said pilot clutch face, said cylindrical surface being sized to remain out of gripping engagement with said coil when the latter is free and expanded but engaged thereby as an incident to energization of said pilot clutch and winding up of said coil whereby to constitute said cylindrical surface and said free end turn an auxiliary clutch energized and released in the winding and unwinding of said coil.

2. A magnetic friction clutch as defined in claim 1 in which said axially facing pole face and said cylindrical surface constitute magnetic poles of opposite polarity separated by a high reluctance gap whereby to extend said toroidal flux axially from said face into said armature turn and then radially through the latter and the cylindrical surface.

3. A magnetic friction clutch as defined in claim 2 in which said high reluctance gap is an annulus of narrow width integrally joining the outer end of said cylindrical surface and the inner periphery of said axial pole face.

4. A magnetic friction clutch having, in combination, a main friction clutch comprising first and second members disposed end to end and mounted for relative rotation about a common axis and having annular friction surfaces around their adjacent ends, said second member being composed of magnetic material and a free floating radially expansible split band encircling said surfaces and contractible in gripping engagement therewith, said band having an outer periphery concentric with said axis, an actuator for said main clutch comprising a helical coil of resilient magnetic metal telescoped around said band, means anchoring one end of said coil to said first member beyond one side of said band, the turn at the other end of said coil being free and spaced axially and outwardly beyond the opposite side of the band and constituting a magnetic armature, and a magnetic pilot clutch for winding and unwinding said coil comprising said armature, an axially facing pole of one polarity rotatable with said second member and disposed adjacent and opposite the outer and axially facing side of said armature turn, a pole of opposite polarity comprising a substantially cylindrical surface on said second member closely telescoped within said armature turn, means rigidly joining said poles but separating the same by a high reluctance section, means on said second member providing a toroidal flux path encircling said high reluctance section and extending axially through said first pole and said armature turn and radially between the later and said second pole, and means for creating magnetic flux in said path to draw said armature and the face of said first pole into gripping engagement and thereby exert torque on said free turn for winding up said coil and contracting said band against said friction surfaces.

5. A magnetic friction clutch having, in combination, a main friction clutch comprising first and second members disposed end to end and mounted for relative rotation about a common axis, said second member being composed of magnetic material, a main friction clutch for coupling said members together frictionally including a helical coil of resilient magnetic metal telescoped around the adjacent ends of said members, means anchoring one end of said coil to said first member, the other end turn of the coil being free and constituting a magnetic armature, and a magnetic pilot clutch for winding and unwinding said coil comprising said armature turn, an axially facing pole of one polarity on said second member and disposed adjacent and opposite the axially facing outer side of said armature turn, a pole of opposite polarity comprising a substantially cylindrical surface on said second member closely telescoped within said armature turn, means rigidly joining said poles but separating the same by a high reluctance section, means providing a toroidal flux path encircling said high reluctance section and extending along the clutch axis through said first pole and said armature turn and radially between the latter and said second pole, and means for creating magnetic flux in said path to draw said armature and the face of said first pole into gripping engagement and thereby exert torque on said free turn for winding up said coil and contracting said armature turn against said cylindrical pole surface.

6. A magnetic friction clutch as defined in claim 5 in which said cylindrical surface, said axially facing pole, said high reluctance section, and the portion of said flux circuit in said second member are integral parts of such second member.

References Cited by the Examiner
UNITED STATES PATENTS

| | | | |
|---|---|---|---|
| 2,566,539 | 9/51 | Starkey | 192—41 |
| 3,006,448 | 10/61 | Fox | 192—81 |
| 3,040,856 | 6/62 | Shoquist | 192—41 |
| 3,095,071 | 6/63 | Mason | 192—81 |

DAVID J. WILLIAMOWSKY, *Primary Examiner.*